United States Patent Office 3,254,947
Patented June 7, 1966

3,254,947
PROCESS FOR PRODUCING AMMONIUM
PERCHLORATE
David R. Stern, Fullerton, Calif., assignor to American Potash & Chemical Corporation, Los Angeles, Calif., a corporation of Delaware
No Drawing. Filed Aug. 7, 1963, Ser. No. 300,660
7 Claims. (Cl. 23—85)

The present invention relates to the purification of an alkali metal halide and more particularly to the removal of small amounts of ammonium perchlorate from sodium chloride.

It is well known that ammonium perchlorate enjoys wide utility as an oxidizer in solid propellant compositions. To be satisfactory for this use, the ammonium perchlorate must be extremely pure since even trace amounts of impurities have powerful adverse effects upon the performance of a solid propellant containing the ammonium perchlorate as an oxidizer.

Ammonium perchlorate is generally produced by a series of steps which include the electrolysis of an aqueous sodium chloride solution to produce sodium chlorate, which is in turn electrolytically converted to sodium perchlorate. The sodium perchlorate is then reacted with ammonium and chloride ions to produce ammonium perchlorate and by-product sodium chloride. The by-product sodium chloride could conveniently be utilized in the first step of the process to produce more sodium chlorate were it not for the fact that it is contaminated with ammonium perchlorate.

Sodium chloride which is contaminated with ammonium perachlorate cannot be utilized as a raw material in a sodium chlorate cell because the ammonium ion undergoes deleterious electrochemical reactions, such as going to nitrogen trichloride which is spontaneously explosive. Also, the ammonium ion may combine to form ammonium chlorate which is a dangerous explosive. The ammonium chlorate may in turn decompose to form the even more dangerous explosive, chlorine dioxide. Moreover, electrochemical sodium chlorate cells are generally operated on a closed cycle, so that any perchlorate ion which is introduced into the solution, is recycled again and again and tends to build up to higher and higher concentration. The presence of the perchlorate ion in a chlorate cell lowers the current efficiency to a point where it eventually renders the cell inoperative.

Various chemical methods have been used to remove ammonium perchlorate from sodium chloride, but these methods have generally been unsuccessful. The ions which have been used to remove the sodium perchlorate are harmful to the process because they interfere with the operation of the sodium chlorate cell. For this reason, methods which require an added chemical reagent generally yield a product which is no better than the initial sodium chloride contaminated with ammonium perchlorate.

These disadvantages are overcome, according to the present invention, by heating solid particulate sodium chloride, containing a small amount of ammonium perchlorate, to a temperature at which the ammonium perchlorate decomposes but below the melting point of sodium chloride, for a period of time sufficient to decompose substantially all of the ammonium perchlorate. This calcination process provides a means for purifying by-product sodium chloride so that it may be recycled for use in the production of sodium chlorate without complicated manipulative procedures and without introducing any extraneous ions to the sodium chloride.

This calcination process can be carried out in either batch or continuous operations using any convenient equipment arrangement whereby sufficient heat is supplied to the sodium chloride to decompose ammonium perchlorate.

Convenient calcining apparatus which can be utilized in the present invention includes rotary kilns, stationary kilns, kettles and the like. A gas-fired, direct heat, counter-current rotary dryer lends itself conveniently to the calcination operation of this process. The particular apparatus, and the manner in which it is operated are not critical in carrying out the present invention so long as sufficient heat is supplied to decompose the ammonium perchlorate.

In general, the small quantity of ammonium perchlorate in the sodium chloride does not exceed 2 or 3 percent, but it may amount to as much as 8 or 10 percent, by weight of the sodium chloride, or even more.

The period of time for which the sodium chloride is subjected to heating is dependent upon the particular apparatus in which the process is conducted, the manner in which the apparatus is operated and the temperature at which the sodium chloride is calcined. Generally, in order to achieve adequate ammonium perchlorate removal, the sodium chloride containing the perchlorate is heated to a temperature between about 350° F. and 1200° F. for a period of time ranging from about 5 minutes to about 40 minutes.

The sodium chloride is heated for a period of time sufficient to remove substantially all of the ammonium perchlorate. This period of time is ascertained by analyzing the sodium chloride at various times during the heating to determine the amount of ammonium perchlorate remaining in the sodium chloride. This analysis can be accomplished by well-known conventional analytical procedures for either the ammonium ion or the perchlorate ion or both ions.

The following example is presented to further illustrate and not to limit the invention. All parts and percentages in the following example, throughout the specification and in the appended claims are by weight unless otherwise indicated.

Example

The following table illustrates the results obtained in removing ammonium perchlorate from sodium chloride using a gas-fired, direct heat, counter-current rotary dryer.

OPERATING DATA AND TEST RESULTS

| Test Run Number | 1 | 2 | 3 | 4 | 5 | 6 |
|---|---|---|---|---|---|---|
| Dryer Air Temp. (° C.— Inlet) | 800 | 800 | 700 | 600 | 500 | 700 |
| Dryer Air Temp. (° C.— Outlet) | 170 | 175 | 160 | 130 | 110 | 150 |
| Gas Pressure to Burner (p.s.i.g.) | 4.0 | 5.2 | 4.0 | 4.2 | 4.6 | 4.2 |
| Gas Flow to Burner (cu. ft./hr.) | 216 | 216 | 180 | 132 | 96 | 185 |
| Dryer Speed (r.p.m.) | 7 | 7 | 7 | 3.75 | 3.75 | 3.75 |
| Feed Rate (lbs./min.) | 3 | 3 | 3 | 3 | 3 | 3 |
| Total Feed to Dryer (pounds) | 180 | 90 | 90 | 90 | 180 | 126 |
| Retention Time in Dryer (min.) | | | 12-15 | .25 | 23 | 30 |
| Feed Temp.—Solids (° F.) | | | | 110 | 110 | 110 |
| Discharge Temp.—Solids (° F.) | | | | 580 | 450 | 720 |
| Air Velocity thru Dryer (ft./sec.) | | | | 1.5 | | |
| Air Exhaust from Dryer (cu. ft./min.) | | | | 170 | | |
| $NH_4ClO_4$ in Feed Solids (percent by weight of feed) | 0.22 | 0.25 | 0.25 | 1.29 | 1.42 | 1.42 |
| $NH_4ClO_4$ in Discharge Solids (percent by weight of discharge) | 0.03 | 0.01 | 0.01 | 0.08 | 0.75 | 0.02 |

As is apparent from the foregoing table, a heated gas having an inlet temperature of about 500 to 800° C., with a sodium chloride retention time in the dryer of from about 5 to 30 minutes, removes substantially all of the ammonium perchlorate from the sodium chloride.

A residual trace amount of 0.08 percent or less of ammonium perchlorate in the sodium chloride after it leaves the dryer is permissible. A satisfactory result can be achieved using an inlet gas temperature of 600–700° C. with a solids retention time in the dryer of about 10–25 minutes.

As will be understood by those skilled in the art, what has been described are the preferred embodiments of the invention. However, many modifications, changes, and substitutions can be made therein wthout departing from the scope and spirit of the invention as defined in the following claims.

What is claimed is:

1. A process which comprises:
heating solid particulate sodium chloride containing a small amount of ammonium perchlorate for a period of time sufficient to decompose substantially all of the ammonium perchlorate;
recovering sodium chloride containing no more than a residual trace amount of ammonium perchlorate,
preparing an aqueous solution of said recovered sodium chloride, and
subjecting the resultant solution to electrolysis to produce sodium chlorate.

2. A process which comprises:
heating a gas to a temperature between about 500° C. and 800° C.;
continuously intimately contacting a stream of said heated gas with particulate sodium chloride containing a small amount of ammonium perchlorate, for a period of time sufficient to decompose substantially all of said ammonium perchlorate;
recovering sodium chloride containing no more than a residual trace amount of ammonium perchlorate,
preparing an aqueous solution of said recovered sodium chloride, and
subjecting the resultant solution to electrolysis to produce sodium chlorate.

3. A process which comprises:
intimately contacting sodium chloride which contains a small amount of ammonium perchlorate with a stream of gas heated to from about 600° C. to about 700° C. for a period of time ranging from about 10 to 25 minutes;
recovering sodium chloride containing no more than a residual trace amount of ammonium perchlorate,
preparing an aqueous solution of said recovered sodium chloride, and
subjecting the resultant solution to electrolysis to produce sodium chlorate.

4. A process comprising the steps of:
electrolytically converting an aqueous solution of sodium chloride to an aqueous solution of sodium chlorate;
electrolytically converting said aqueous solution of sodium chlorate to an aqueous solution of sodium perchlorate;
reacting said sodium perchlorate with ammonium and chloride ions to produce ammonium perchlorate and sodium chloride;
returning said sodium chloride for use in the production of sodium chlorate;
and heating said sodium chloride before returning it for use in the production of sodium chlorate for a period of time sufficient to decompose substantially all of the ammonium perchlorate contained in said sodium chloride.

5. A process which comprises:
introducing solid particulate sodium chloride containing a small amount of ammonium perchlorate into a rotary kiln dryer;
heating said particulate sodium chloride in said rotary dryer using an air inlet temperature of from about 500° C. to 800° C.;
retaining said sodium chloride in said dryer for a period of time ranging from about 5 minutes to 30 minutes;
recovering sodium chloride from said dryer which contains no more than a residual trace amount of ammonium perchlorate,
preparing an aqueous solution of said recovered sodium chloride, and
subjecting the resultant solution to electrolysis to produce sodium chlorate.

6. A process which comprises:
heating solid particulate sodium chloride containing a small amount of ammonium perchlorate to a temperature between about 350° F. to 1200° F. for a period of time ranging from about 5 minutes to 40 minutes;
recovering sodium chloride containing no more than about 0.08% ammonium perchlorate,
preparing an aqueous solution of said recovered sodium chloride, and
subjecting the resultant solution to electrolysis to produce sodium chlorate.

7. A process which comprises:
heating solid particulate sodium chloride containing a small amount of ammonium perchlorate for a period of time sufficient to decompose substantially all of the ammonium perchlorate to produce sodium chloride containing no more than 0.08% ammonium perchlorate;
subjecting an aqueous solution of the ammonium perchlorate-free sodium chloride to electrolysis to produce sodium chlorate;
electrolytically converting said sodium chlorate to sodium perchlorate;
reacting said sodium perchlorate with ammonium and chloride ions to produce ammonium perchlorate and sodium chloride; and
separating the ammonium perchlorate from the sodium chloride, the sodium chloride being contaminated with a small amount of ammonium perchlorate.

References Cited by the Examiner

UNITED STATES PATENTS 2,739,873  3/1956  Schumacher _____ 23—85

OTHER REFERENCES

J. W. Mellor's "A Comprehensive Treatise on Inorg. and Theo. Chem.," volume 2, 1922 edition, pages 396, 397, Longmans, Green & Co., New York.

"The Condensed Chem. Dictionary," 6th edition, 1956, pages 74 and 1037, Reinhold Pub. Corp., New York.

BENJAMIN HENKIN, *Primary Examiner.*

MAURICE A. BRINDISI, *Examiner.*

E. STERN, *Assistant Examiner.*